United States Patent
Huang

[11] Patent Number: 5,898,759
[45] Date of Patent: *Apr. 27, 1999

[54] TELEPHONE ANSWERING MACHINE WITH ON-LINE SWITCH FUNCTION

[75] Inventor: Shih-Wei Huang, Taipei county, Taiwan

[73] Assignee: Chaw Khong Technology Co., Ltd., Taipei County, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,069

[22] Filed: Aug. 27, 1996

[51] Int. Cl.⁶ .................................................. H04M 1/64
[52] U.S. Cl. ........................... 379/67.1; 379/70; 379/76; 379/82; 379/85; 379/88.07; 379/88.23; 379/88.26
[58] Field of Search .................................. 379/67, 88, 89, 379/67.1, 70, 76, 82, 85, 88.07, 88.23, 88.26

[56] References Cited

U.S. PATENT DOCUMENTS

| | | | |
|---|---|---|---|
| 4,782,510 | 11/1988 | Szlam | 379/88 |
| 4,821,311 | 4/1989 | Hashimoto | 379/88 |
| 5,001,743 | 3/1991 | Lenaerts | 379/67 |
| 5,022,069 | 6/1991 | Chen | 379/67 |
| 5,283,818 | 2/1994 | Klausner et al. | 379/67 |
| 5,400,393 | 3/1995 | Knuth et al. | 379/88 |

*Primary Examiner*—Fan S. Tsang
*Assistant Examiner*—Allan Hoosain
*Attorney, Agent, or Firm*—Christensen O'Connor Johnson & Kindness PLLC

[57] ABSTRACT

The present invention relates to a telephone answering machine which can be initiated after a telephone connection is established. It comprises a memory for storing out-going messages and incoming messages, a voice processing circuit for playing the out-going messages stored in the memory and recording incoming messages into the memory, a line interface circuit connected to an external telephone network for connecting the voice processing circuit to the telephone network, a microprocessor for controlling the voice processing circuit and the line interface circuit, and a recording key connected to the microprocessor wherein the microprocessor establishes a telephone connection between the voice processing circuit and the telephone network by using the line interface circuit and initiates the voice processing circuit to play an outgoing message and record incoming messages after the recording key is actuated.

6 Claims, 3 Drawing Sheets

TELEPHONE ANSWERING MACHINE WITH ON-LINE SWITCH FUNCTION

BACKGROUND OF THE INVENTION

1. Field of the Invention

The present invention relates to a telephone answering machine, and more particularly, to a telephone answering machine which can be initiated after a telephone connection is established.

2. Description of the Prior Art

Telephone answering machines are used in almost every household for answering telephones and recording incoming messages when users of the machines are not available. When digital answering machines (DAM) begin emerging in the market, versatile electronic functions are added to such answering machines by using some electronic chips available in the market. A telephone answering machine is usually triggered by incoming ring signals when the number of ring signals exceed a predetermined number set by the user or manufacturer of the machine. When it is initiated, an out-going message which comprises greetings and recording instructions prepared by a user will be played to the caller and then incoming messages from the caller will be recorded. Some other functions such as multiple voice mail boxes for recording incoming messages for each individuals of a household may also be initiated in the same time if such functions are available in the machine. In such case the caller has to select one voice mail box first so that he can leave his messages to the right person.

One problem with most telephone answering machines is that if a person at the receiving end picks up the phone and find that he is not the right person to answer the phone, there is no way for him to switch the phone to the answering machine because most answering machines can only be initiated by a predetermined number of ring signals and there is no way to start the machine after the phone is picked up. The person either has to transfer the message for the caller or he has to request the caller to call again so that the answering machine can be initiated at the second call. Apparent such process is very inconvenient both to the caller and to the person who answers the phone.

SUMMARY OF THE INVENTION

It is therefore a primary objective of the present invention to provide an answering machine which can be initiated after a telephone connection is established.

It is another objective of the present invention to provide an answering machine which will start recording an incoming message after the person who initiates the answering machine hangs up the phone so that the incoming message can be safely recorded.

Briefly, in a preferred embodiment, the present invention includes a telephone answering machine comprising:

(1) a memory for storing out-going messages and incoming messages;

(2) a voice processing circuit for playing the out-going messages stored in the memory and recording incoming messages into the memory;

(3) a line interface circuit connected to an external telephone network for connecting the voice processing circuit to the telephone network;

(4) control means for controlling the voice processing circuit and the line interface circuit; and (5) a recording key connected to the control means;

wherein the control means establishes a telephone connection between the voice processing circuit and the telephone network by using the line interface circuit and initiates the voice processing circuit to play an outgoing message and record incoming messages after the recording key is actuated.

The line interface circuit of the answering machine further comprises a phone interface for connecting a telephone to the telephone network and a detecting circuit for detecting on-hook and off-hook status of the telephone wherein the control means initiates the voice processing circuit to play an outgoing message and record incoming messages after the recording key is actuated and the on-hook status is detected by the detecting circuit.

It is an advantage of the present invention that the answering machine can be initiated by pressing a recording key after a telephone connection is established so that the caller is not necessary to call again in order to record his incoming message to the answering machine.

It is another advantage of the present invention that it starts recording the incoming message after the telephone connected to the answering machine is in an on-hook status so that the incoming message can be safely recorded.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
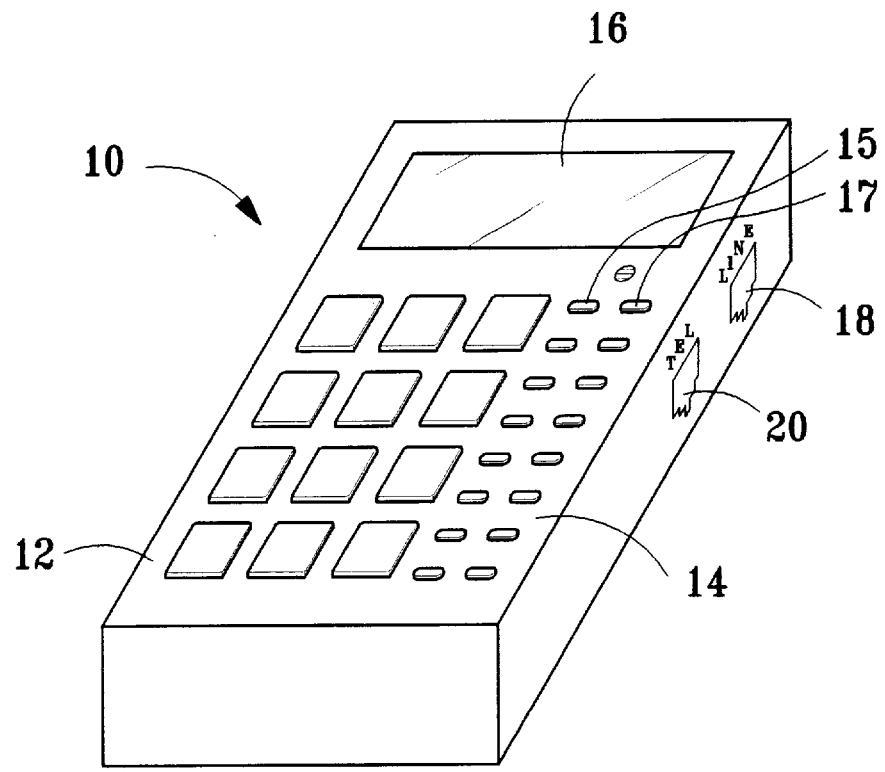
FIG. 1 is a perspective view of a telephone answering machine according to the present invention.

FIG. 1 is a perspective view of a telephone answering machine 10 according to the present invention. The answering machine 10 comprises a plurality of digit keys 12 and function keys 14, a display 16 for displaying messages outputted by the answering machine 10 or inputs from a user by pressing any of the keys, and two telephone sockets 18 and 20. Socket 18 is used for connecting a telephone network and socket 20 is used for connecting a local telephone. Two special function keys 15 and 17 are devised according to the present invention. Key 15 is a selection key 15 for selecting a voice mail box created inside the answering machine 10 by a user for storing his personal out-going message and incoming messages. And key 17 is a recording key for triggering the answering machine 10 to start an incoming message recording process 80 presented in FIG. 5.

Figure 2:
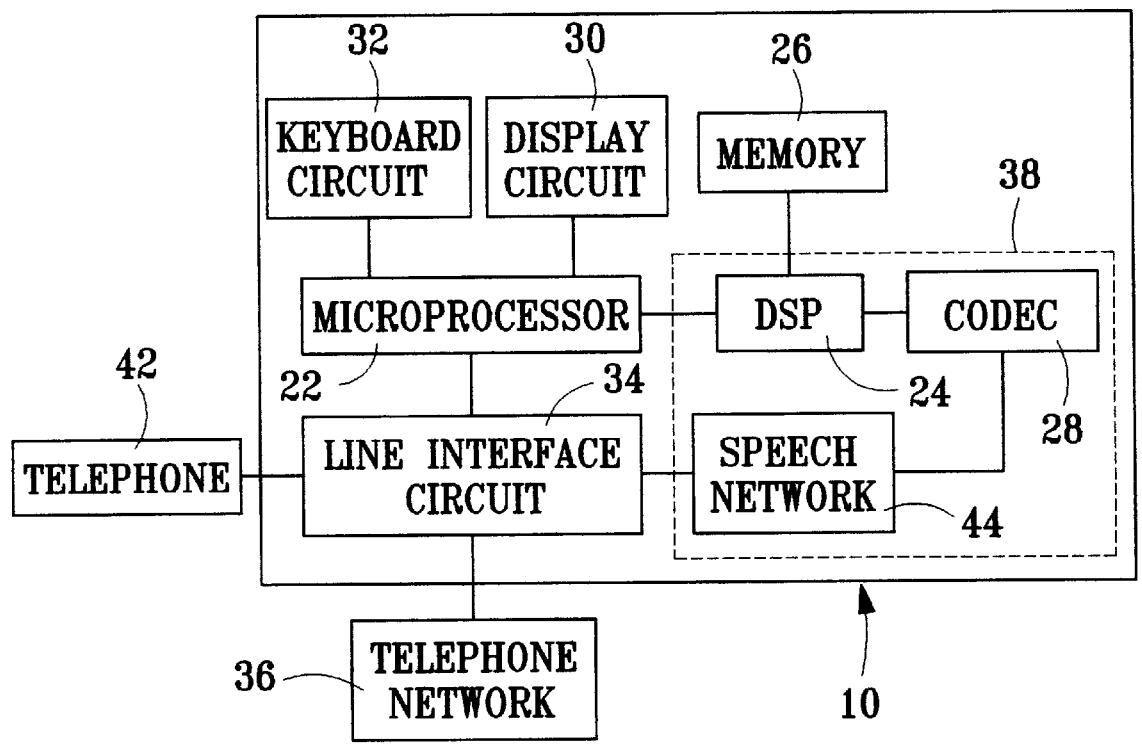
FIG. 2 is a function block diagram of the answering machine.

FIG. 2 is a function block of the answering machine 10. It comprises a microprocessor 22 for controlling the operations of the answering machine 10, a digital signal processor (DSP) 24 connected to the microprocessor 22 for processing voice signals under the control of the microprocessor 22 and also performing some other functions such as detecting caller party tone (CPT), a memory 26 for storing out-going messages prepared by users of the answering machine 10 and all the incoming messages, a codec (coder/decoder) 28 for encoding analog voice signals transmitted from the speech network 44 and decoding the digital voice signals from the DSP 24, a display circuit 30 connected to the microprocessor 22 for controlling the display 16 of the answering machine 10, a keypad circuit 30 connected to the microprocessor 22 for controlling the digit keys 12 and function keys 14, a line interface circuit 34 for connecting a telephone network 36 and a local telephone 42, and a speech network 44 for transmitting the analog voice signals between the line interface circuit 34 and the codec 28. The DSP 24, codec 28 and the speech network 44 defines a voice processing circuit 38 which is used for playing the out-going messages stored in the memory 26 and recording incoming messages into the memory 26 under the control of the microprocessor 22.

Figure 3:
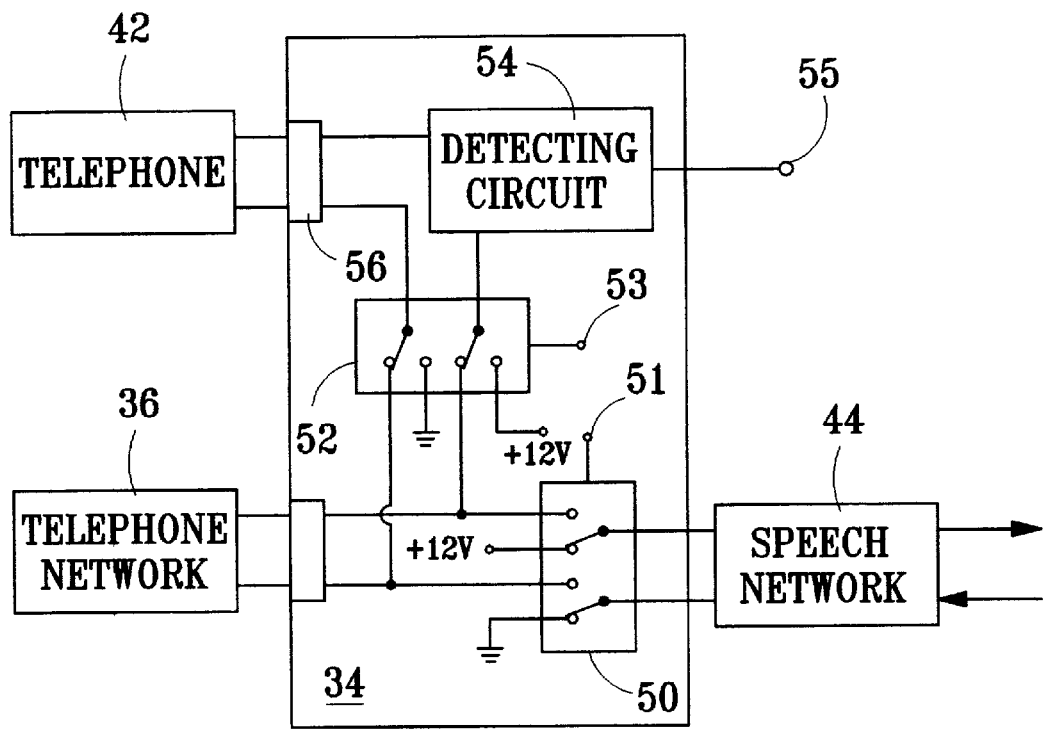
FIG. 3 is a circuit diagram of the line interface circuit shown in FIG. 2.

FIG. 3 is a circuit diagram of the line interface circuit 34 shown in FIG. 2. The line interface circuit 34 comprises a first switch 50 controlled by control signals inputted from port 51 for connecting or disconnecting the connection between the speech network 44 and the telephone network 36, a telephone interface 56 for connecting the telephone 42 to the telephone network 36, a second switch 52 controlled by control signals inputted from port 53 for connecting or disconnecting the connection between the telephone 42 and the telephone network 36, and a detecting circuit 54 connected to the telephone interface 56 for detecting on-hook/off-hook status of the telephone 42 and incoming ring signals. The outputs of the detecting circuit 54 are transmitted to the microprocessor 22 through port 55. Both the ports 51 and 53 are connected to the microprocessor 22 which generates the control signals in various conditions to control the first switch 50 and the second switch 52.

Figure 4:
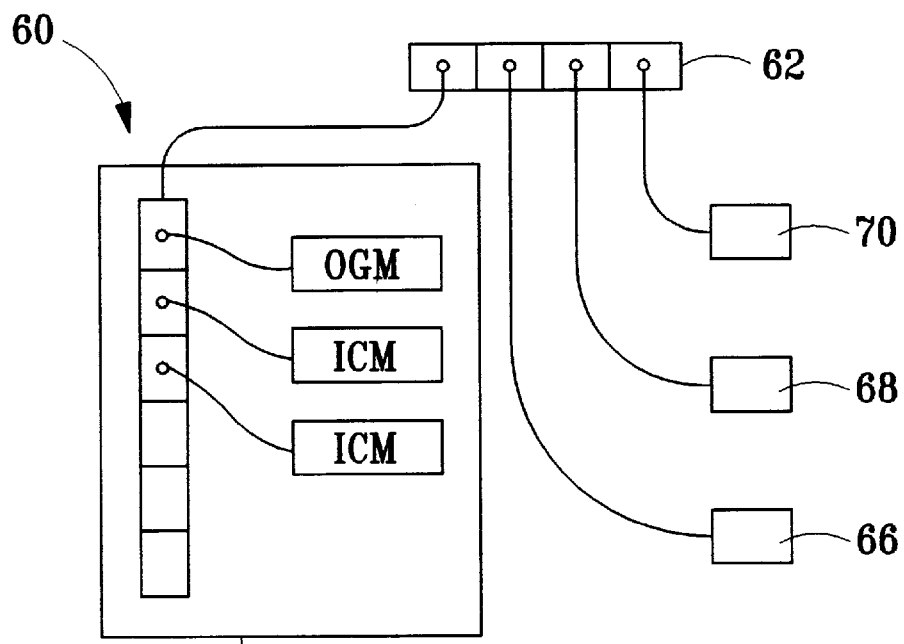
FIG. 4 is a diagrammatic view of the data structure of the voice mail boxes stored in the transceiver's memory shown in FIG. 2.

FIG. 4 is a diagrammatic view of the data structure 60 of the voice mail boxes stored in the memory 26 of the transceiver 10 shown in FIG. 2. It shows how the out-going messages and incoming messages stored in the memory 26 are organized. The data structure 60 comprises an voice mail box address table 62 which comprises the addresses of four voice mail boxes 64, 66, 68 and 70 stored in the memory 26. The detail structure of the voice mail box 64 is the only one presented. The voice mail box 64 comprises an OGM 74, and two ICMs 76, and an address table 72 which comprises the addresses of the OGM 74 and the two ICMs 76. The structures of the other three voice mail boxes 66, 68 and 70 are all the same. One of the voice mail boxes is usually designated as a public voice mail box by the answering machine manufacturer and the rest of them are private voice mail box. Each private voice mail box is created by one user of the answering machine 10 for storing personal OGM and ICMs.

Figure 5:
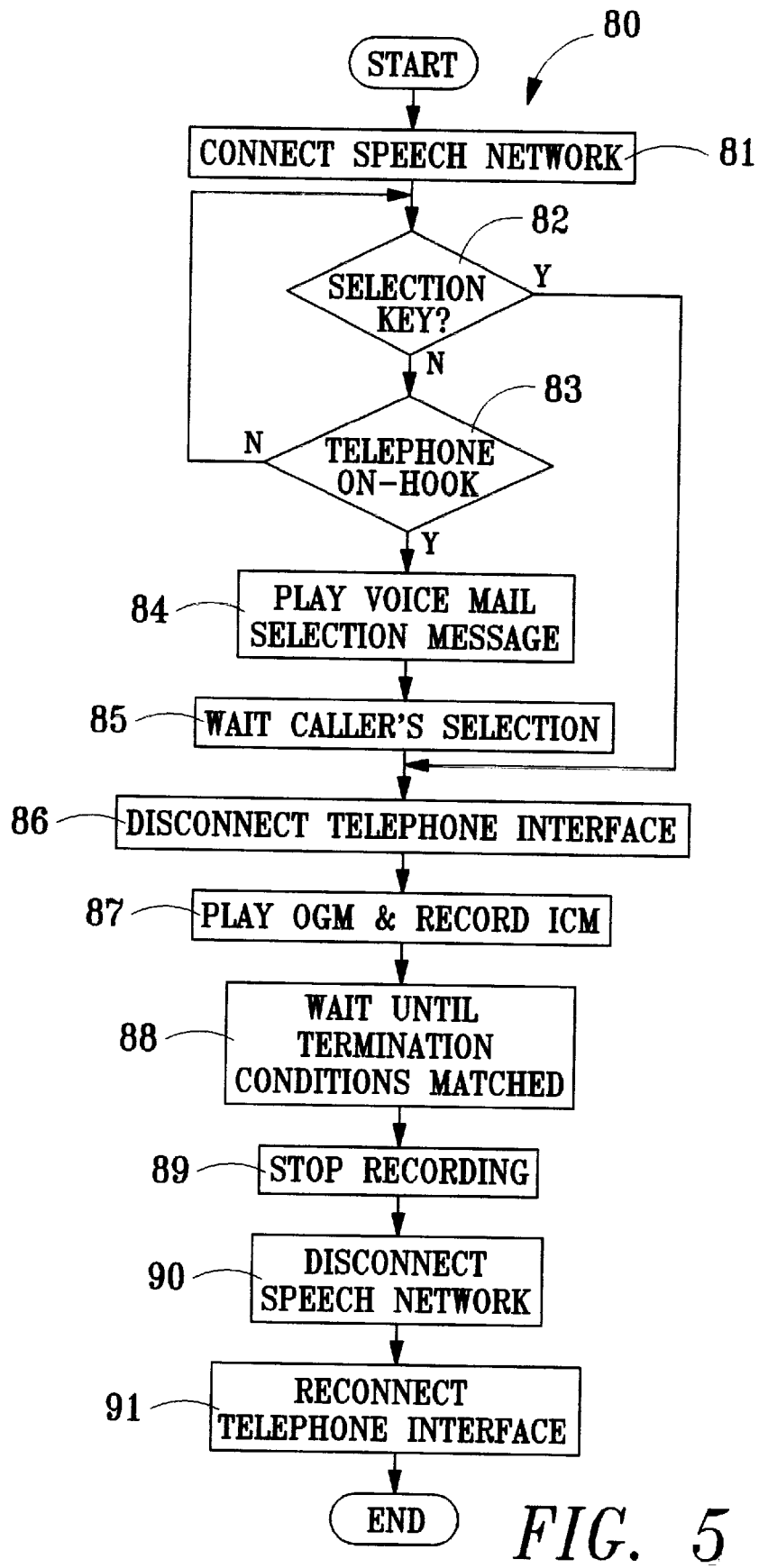
FIG. 5 is an incoming message recording process executed by the answering machine according to the present invention.

FIG. 5 is an incoming message recording process 80 executed by the microprocessor 22 of the answering machine 10 according to the present invention. The process 80 is initiated when the recording key 17 is pressed by a user after a telephone connection between the telephone 42 and the telephone network 36 is established. That means the microprocessor 22 will initiate the voice processing circuit 38 to play an outgoing message and record incoming messages only if an off-hook status is detected by the detecting circuit 54 when the recording key 17 is actuated.

The process 80 comprises the following steps:

step 81 establish a telephone connection between the telephone network 36 and the speech network 44 by issuing an "on" control signal to the switch 50 of the line interface circuit 34;

step 82 check if the user has selected a voice mail box number by using the selection key 15; go to 86 if yes;

step 83 check the status of the telephone 42 to determine if it is in an on-hook status by using the detecting circuit 54 of the line interface circuit 34; go to step 82 if no;

step 84 start playing a voice mail selection message stored in the memory 26 by using the voice processing circuit 38;

step 85 wait until the caller makes a voice mail box selection;

step 86 disconnect the telephone interface 56 by issuing an "off" control signal to the switch 52 in order to avoid possible reconnection of the telephone 42;

step 87 start playing the OGM of the selected voice mail box and recording an incoming message to the selected voice mail box;

step 88 wait until a CPT is detected by the DSP 24 or until a time limit set by the user of the selected voice mail box has been reached;

step 89 stop recording the incoming message;

step 90 disconnect the speech network 44 by issuing an "off" control signal to the switch 50;

step 91 reconnect the telephone interface 56 by issuing an "on" control signal to the switch 52;

The process 80 is initiated when a user who answers an incoming telephone call decides that the answering machine 10 should be used to record an incoming message. After pressing the recording key 17, the microprocessor 22 initiates the process 80. The user can either select a voice mail box number by using the selection key 15 or he/she can hang up the telephone and have the caller to make a selection. After the selection is made, local telephone connection will be terminated by the answering machine by switching off the switch 52 to avoid reconnection of the local telephone 42. And the voice processing circuit 38 will start playing the OGM of the selected voice mail box and recording ICM into the selected voice mail box. After the recording work is done, the local telephone connection is resumed by turning on the switch 52.

The use of the detecting circuit 54 for detecting the status of the telephone 42 provides an important security feature. A user can initiate the process 80 only when the telephone 42 is connected to the phone interface 56 of the answering machine 10. And before playing the OGM of the selected voice mail box in step 87, the process 80 will disconnect the local telephone connection in step 86 to make sure that the incoming message will not be heard by the local user.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for playing outgoing messages and recording incoming messages in an answering machine after an incoming call has been inadvertently answered by an answering party, said answering machine being connected between a telephone and a telephone network, the method comprising the steps of:

(a) having the answering party use the telephone to answer said incoming call from the telephone network;

(b) connecting the telephone network to a voice processing circuit capable of playing an outgoing message and recording an incoming message; and (c) disconnecting the telephone from the telephone network and the answering machine before the voice processing unit plays the outgoing message and records the incoming message.

2. The method of claim 1 further comprising the steps of:
(a) providing a memory for the answering machine; and
(b) allocating the memory into a plurality of selectable voice mailboxes.

3. The method of claim 2 further comprising the steps of:
(a) actuating a recording key on the answering machine;
(b) detecting an on hook signal after the step of actuating a recording key and before the step of disconnecting the telephone; and
(c) playing a voice mail selection message and a mailbox outgoing message of one of the plurality of selectable voice mailboxes and recording an incoming message for the one of the plurality of selectable voice mailboxes when an on hook signal is detected after the recording key is actuated.

4. The method of claim 3 further comprising the step of allowing a caller to select the one of the plurality of selectable voice mailboxes after the voice mail selection message is played.

5. The method of claim 2 further comprising the steps of:
(a) actuating a selection key on the answering machine;
(b) detecting an off hook signal during the step of actuating a selection key and before the step of disconnecting the telephone; and
(c) playing a mailbox outgoing message of one of the plurality of selectable voice mailboxes and recording an incoming message for the one of the plurality of selectable voice mailboxes only if an off hook signal is detected when the selection key is actuated.

6. The method of claim 2 further comprising the step of designating the plurality of selectable voice mailboxes as private and public.

* * * * *